March 29, 1960     S. G. BUDAI     2,930,665
FLEXIBLE OFFICE WORK SPACE AND PARTITION STRUCTURE
Original Filed Aug. 23, 1951     9 Sheets-Sheet 1
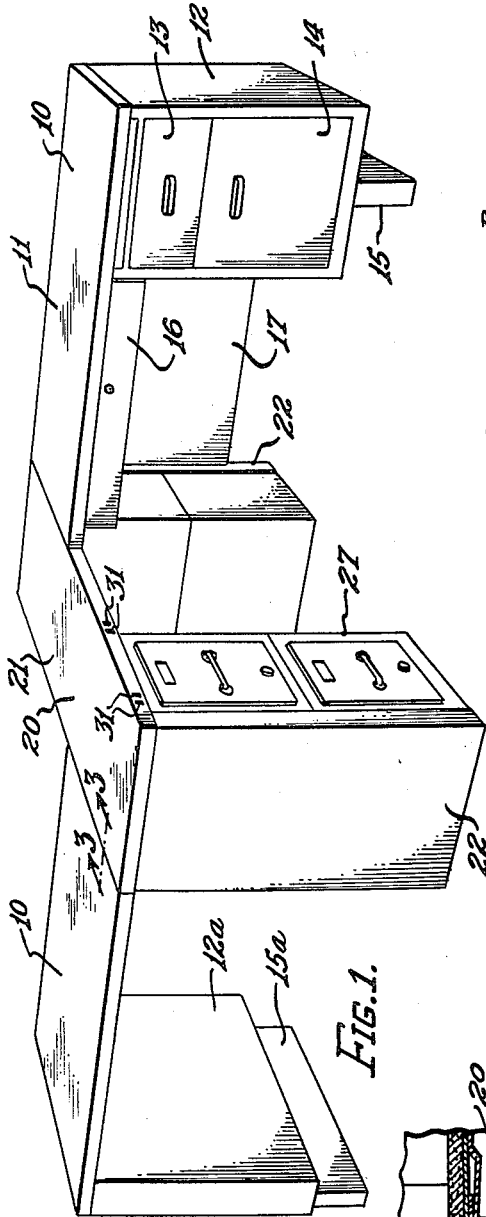
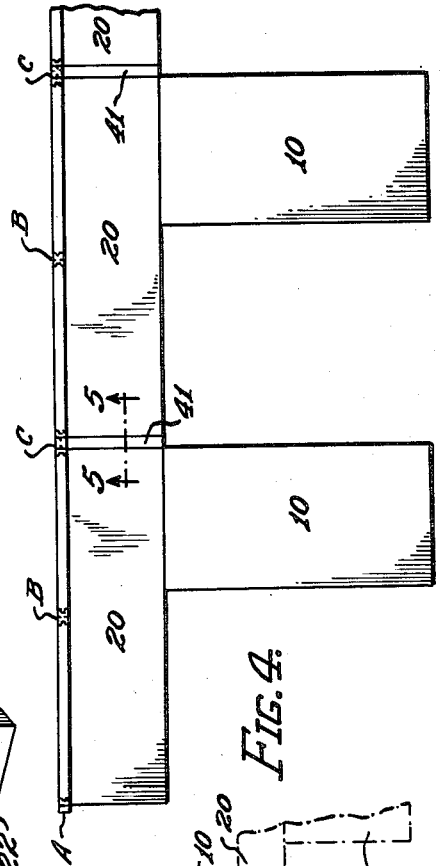
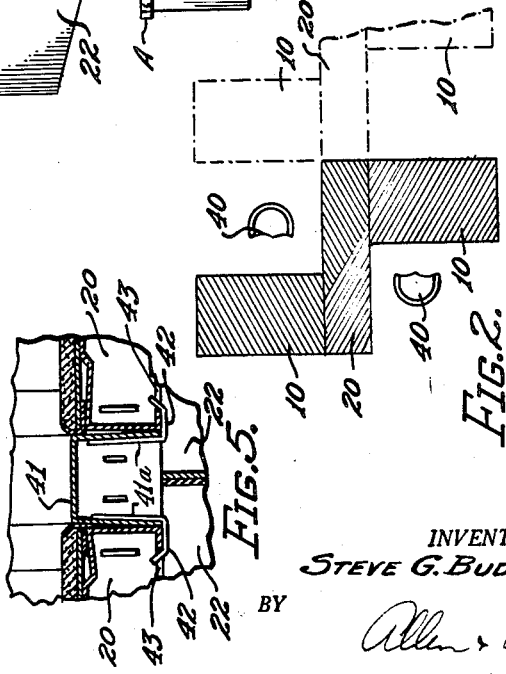
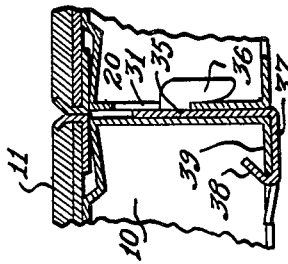
INVENTOR.
STEVE G. BUDAI,
BY
ATTORNEYS.

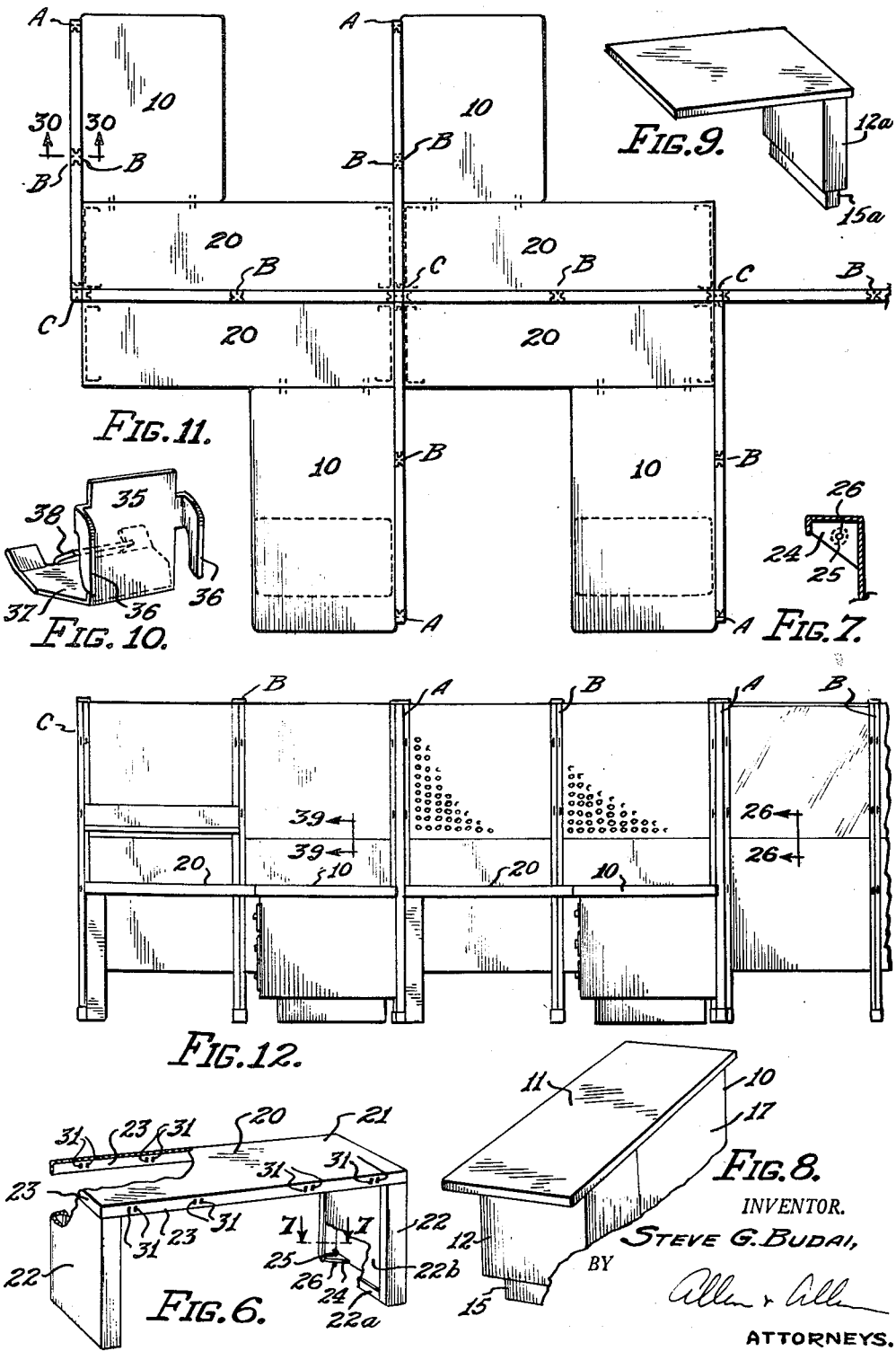

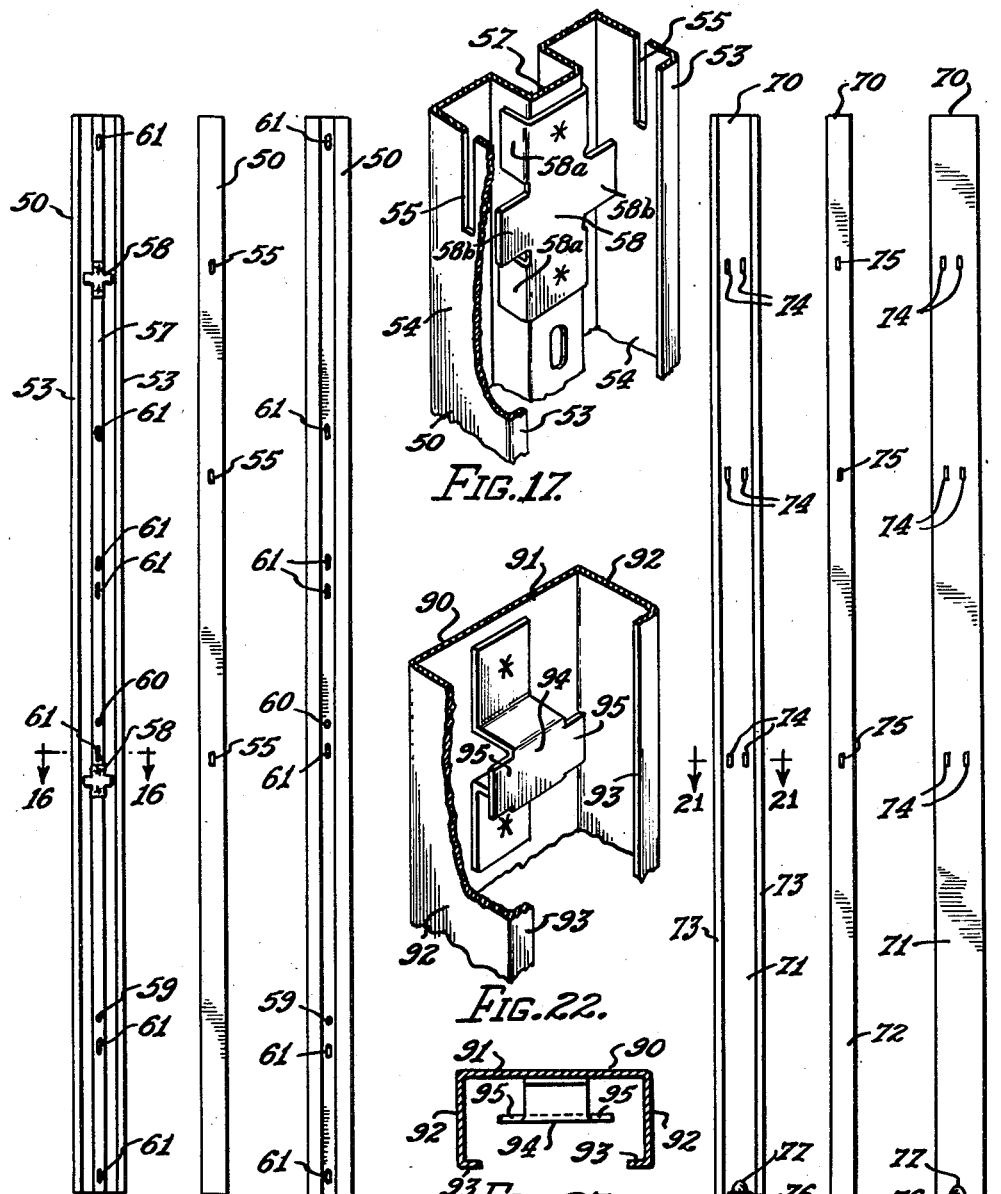

March 29, 1960 S. G. BUDAI 2,930,665
FLEXIBLE OFFICE WORK SPACE AND PARTITION STRUCTURE
Original Filed Aug. 23, 1951 9 Sheets-Sheet 4

INVENTOR.
STEVE G. BUDAI,
BY
Allen + Allen
ATTORNEYS.

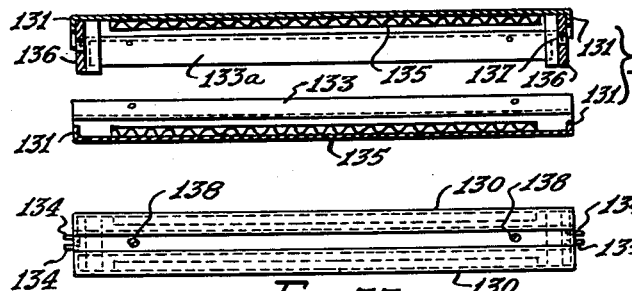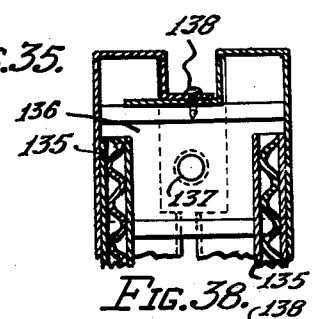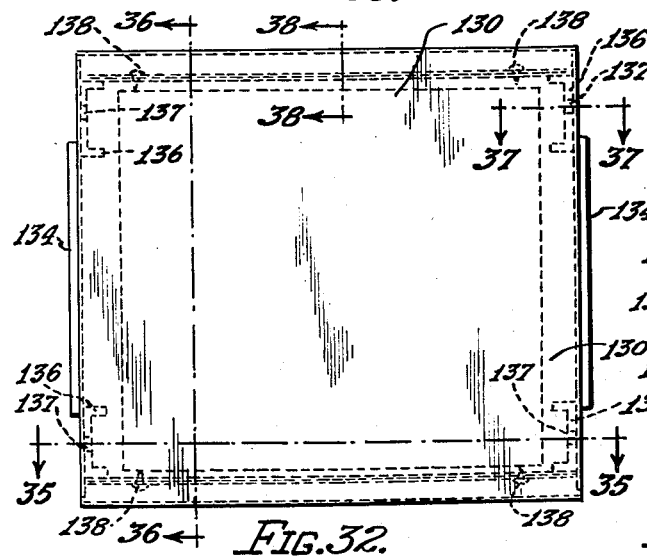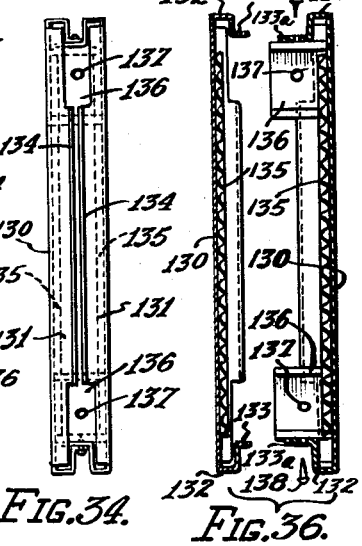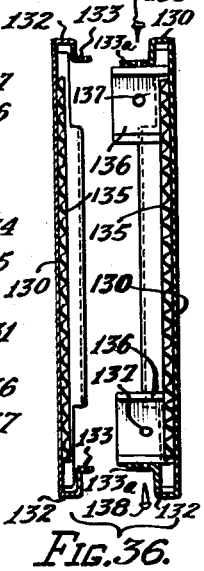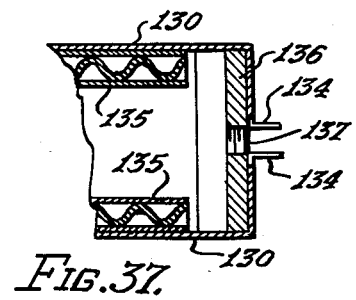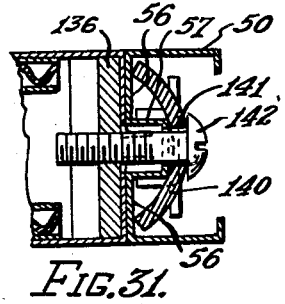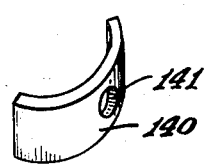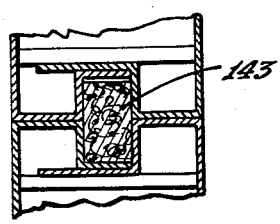

March 29, 1960 S. G. BUDAI 2,930,665
FLEXIBLE OFFICE WORK SPACE AND PARTITION STRUCTURE
Original Filed Aug. 23, 1951 9 Sheets-Sheet 7
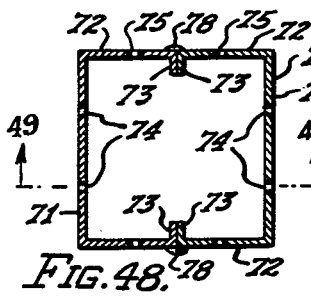
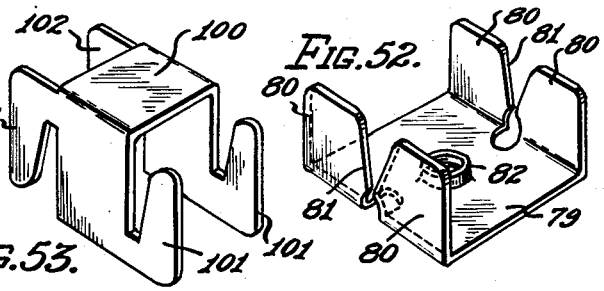
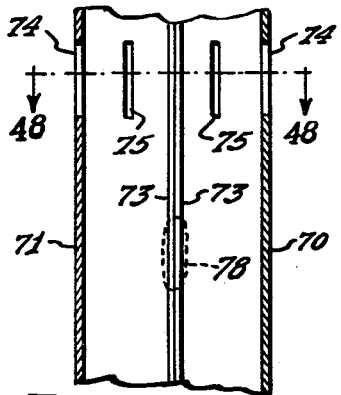
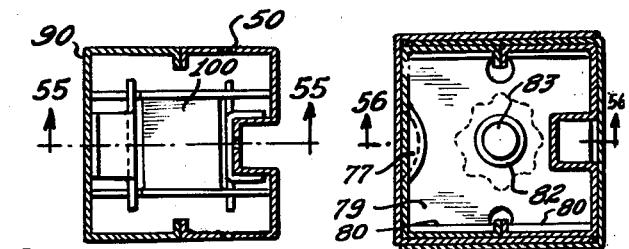
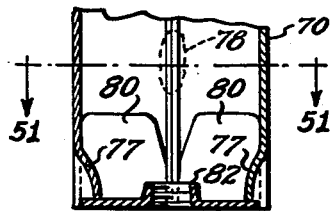
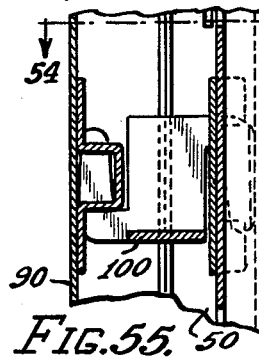
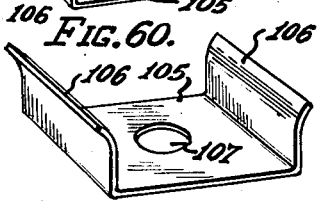
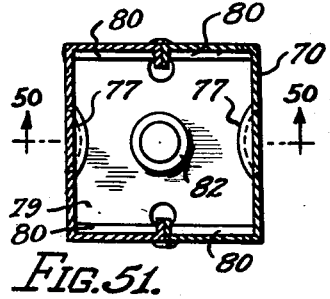
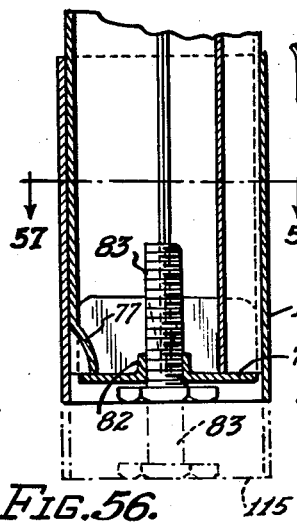
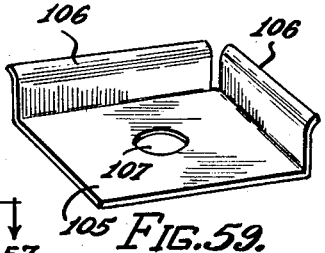
INVENTOR.
STEVE G. BUDAI,
ATTORNEYS.

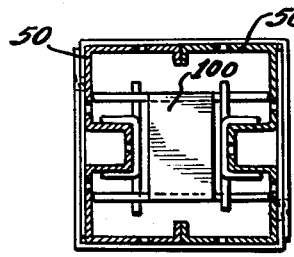
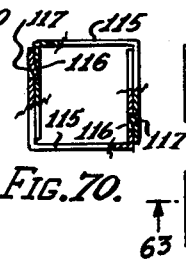
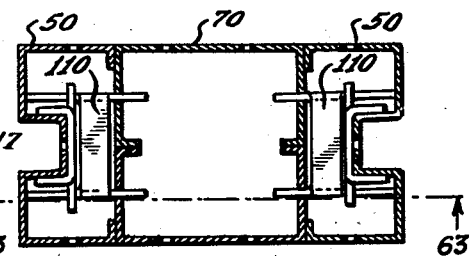
FIG.66. FIG.70. FIG.62.
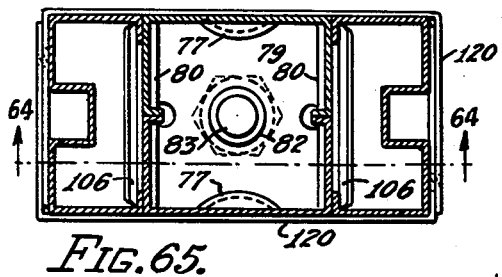
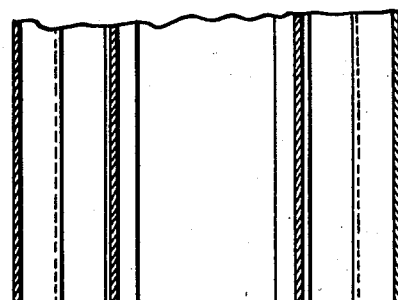
FIG.65. FIG.63.
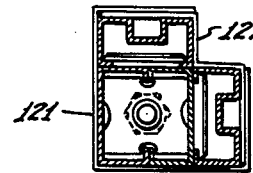
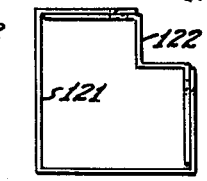
FIG.67. FIG.71.
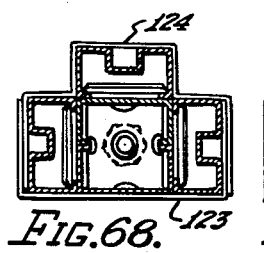
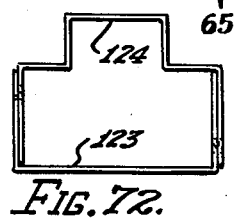
FIG.68. FIG.72.
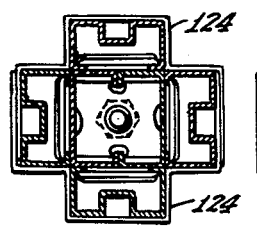
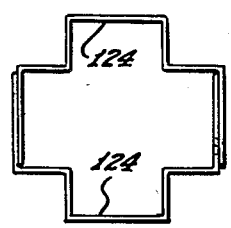
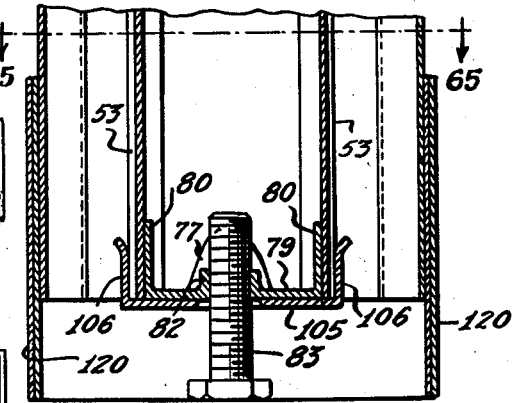
FIG.69. FIG.73. FIG.64.
INVENTOR.
STEVE G. BUDAI,
BY
ATTORNEYS.

March 29, 1960  S. G. BUDAI  2,930,665
FLEXIBLE OFFICE WORK SPACE AND PARTITION STRUCTURE
Original Filed Aug. 23, 1951  9 Sheets-Sheet 9
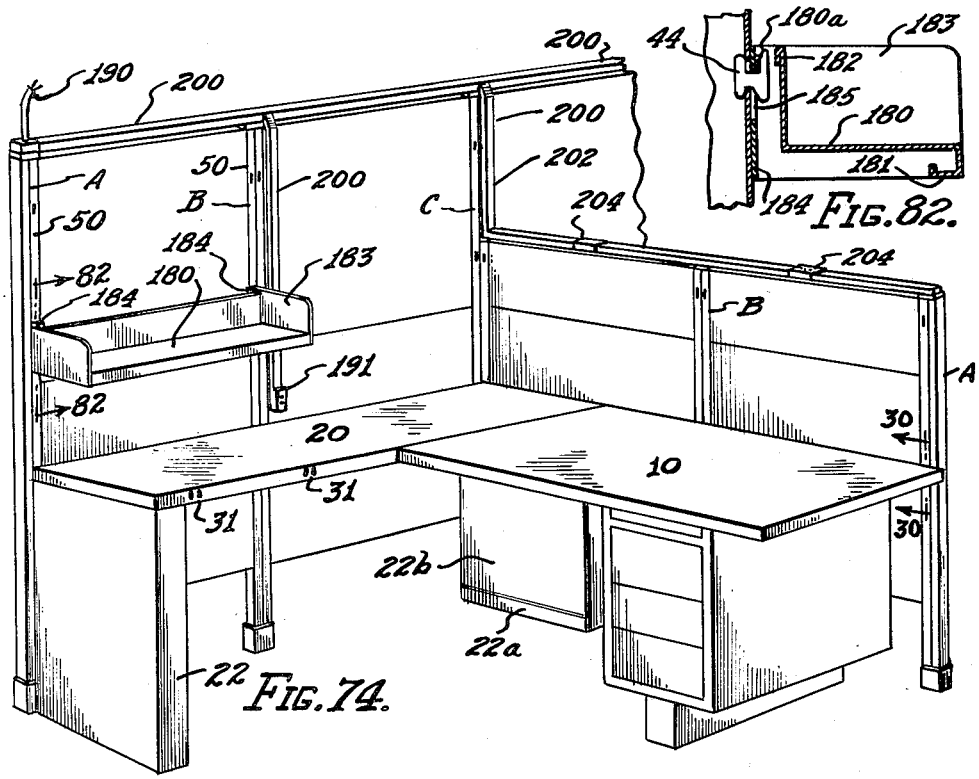
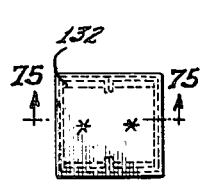
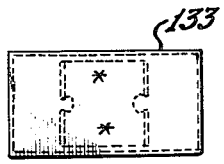
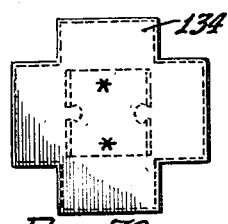
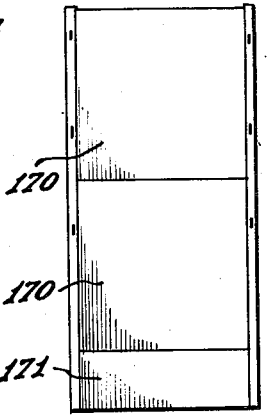
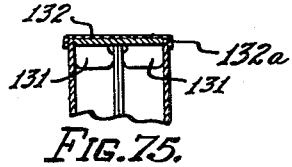
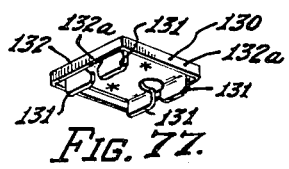
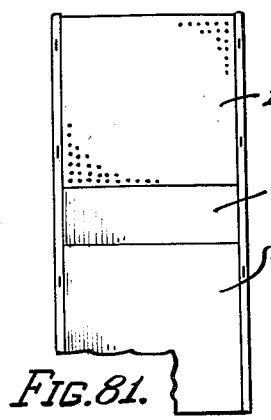
INVENTOR.
STEVE G. BUDAI,
BY
ATTORNEYS.

United States Patent Office 2,930,665
Patented Mar. 29, 1960

2,930,665

FLEXIBLE OFFICE WORK SPACE AND PARTITION STRUCTURE

Steve G. Budai, Cincinnati, Ohio, assignor, by mesne assignments, to The Globe-Wernicke Co., a corporation of Ohio Original application August 23, 1951, Serial No. 243,261, now Patent No. 2,746,109, dated May 22, 1956. Divided and this application January 16, 1956, Serial No. 560,927

8 Claims. (Cl. 312—111)

This invention relates to a flexible office work space and partition structure. From recent studies as to usability of work spaces of various sizes and shapes it has been rather conclusively determined that the so-called L-shaped work space is the most economical in terms of optimum utilization of available area, and is a division of my copending application Serial No. 243,261, filed August 23, 1951, now Patent No. 2,746,109.

It is an object of the present invention to provide a number of units which can be used to provide such an L-shaped work space. It is an object of the invention to provide a desk unit which can be combined with other units in the provision of an L-shaped work space. Another object of the present invention is the provision of a table unit which can also be combined with other table units or desk units to provide a series of L-shaped work spaces.

It is yet another object of the invention to provide a partition structure which can be combined with the table units and desk units to provide partitioned L-shaped work areas. It is still another object of the invention to provide partition members of standard dimensions comprising a pair of unit post members with panel members extending therebetween. In connection with the last named object it is still another object of the invention to provide an intermediate post construction so that partition members as outlined above may be secured to such intermediate posts for the purpose of providing corners in the partition structure or for the purpose of providing branch runs to either side if desired. It is still another object of the invention to provide end post members which can be combined with unit post members to provide for a finished end structure at the end of a partition.

It is yet another object of the invention to provide means whereby the various unit post members may be secured to each other or to intermediate post members in a simple and detachable manner so that the structure of my invention will have great flexibility and can be rearranged if desired without the employment of special skills or special tools.

Still another object of the invention involves the provision of panel members for the partition structure outlined above and the provision of panel members of various heights for various purposes.

These and other objects of the invention which will be pointed out in more detail hereinafter or which will appear to one skilled in the art upon reading these specifications, I accomplish by that certain construction and arrangement of parts of which I shall now describe certain exemplary embodiments. Reference is made to the drawings forming a part hereof and in which:

Figure 1 is a perspective view of a basic arrangement of units without partitions providing two oppositely directed L-shaped work spaces.

Figure 2 is a diagrammatic plan view of the same on a considerably smaller scale.

Figure 3 is an enlarged fragmentary cross-sectional view taken on the line 3—3 of Figure 1.

Figure 4 is a plan view of an alternate arrangement of the structure of Figure 1 and showing a partition in use.

Figure 5 is an enlarged fragmentary sectional view taken on the line 5—5 of Figure 4 showing the use of a filler strip between table units where no partition is provided between such table units.

Figure 6 is a perspective view with parts broken away showing a basic table unit.

Figure 7 is an enlarged fragmentary sectional view taken on the line 7—7 of Figure 6.

Figure 8 is a fragmentary perspective view from the rear of a basic desk unit.

Figure 9 is a perspective view of a different form of basic desk unit.

Figure 10 is a perspective view of a hook member employed for securing together a desk according to Figures 8 or 9 and a table according to Figure 6.

Figure 11 is a plan view showing an exemplary arrangement of table units and desk units with partition members dividing the arrangement into a plurality of compartments each providing an L-shaped work space.

Figure 12 is a front elevational view of Figure 11.

Figure 13 is an elevational view of a unit post member as seen from the panel side thereof.

Figure 14 is a side elevational view of the same.

Figure 15 is a rear elevational view as seen from the opposite side of Figure 13.

Figure 16 is a cross-sectional view on an enlarged scale taken on the line 16—16 of Figure 13.

Figure 17 is an enlarged fragmentary perspective view of a unit post as seen from the same side as Figure 13.

Figure 18 is an elevational view of a half portion of an intermediate post.

Figure 19 is a side elevational view of the same.

Figure 20 is an elevational view of the same as seen from the opposite side of Figure 18.

Figure 21 is a cross-sectional view on an enlarged scale taken on the line 21—21 of Figure 18.

Figure 22 is a fragmentary perspective view of an end post member which differs only slightly from an intermediate post member as shown in Figures 18 to 21 inclusive.

Figure 23 is a cross-sectional view through an end post member.

Figure 31 is a fragmentary cross-sectional view on an enlarged scale taken on the line 31—31 of Figure 24.

Figure 32 is a front elevational view of a single panel member.

Figure 33 is a top plan view of the same.

Figure 34 is a side elevational view of the same.

Figure 35 is an exploded cross-sectional view taken on the line 35—35 of Figure 32.

Figure 36 is an exploded cross-sectional view taken on the line 36—36 of Figure 32.

Figure 37 is a fragmentary cross-sectional view on an enlarged scale taken on the line 37—37 of Figure 32.

Figure 38 is an enlarged fragmentary cross-sectional view taken on the line 38—38 of Figure 32.

Figure 39 is a fragmentary cross-sectional view on an enlarged scale taken on the line 39—39 of Figure 12.

Figure 40 is a perspective view of the arch-shaped clip member seen in Figure 31.

Figure 48 is a cross-sectional view of an intermediate post constituted of two of the members of Figure 18 welded together.

Figure 49 is a fragmentary cross-sectional view of the same taken on the line 49—49 of Figure 48.

Figure 50 is a fragmentary cross-sectional view of the same but taken at the bottom of the intermediate post, taken on the line 50—50 of Figure 51.

Figure 51 is a cross-sectional view taken on the line 51—51 of Figure 50.

Figure 52 is a perspective view of a bottom piece or plug having a threaded boss.

Figure 53 is a perspective view of a hook member by means of which two unit posts, or a unit post and an end post, may be joined together.

Figure 54 is a cross-sectional view taken on the line 54—54 of Figure 55 showing an end post member according to Figures 22 and 23 combined with a unit post member according to Figures 13 to 17 inclusive to provide a finished end for a partition section.

Figure 55 is a fragmentary cross-sectional view of the same taken on the line 55—55 of Figure 54.

Figure 56 is a fragmentary cross-sectional view at the bottom of the combined posts of Figures 54 and 55 taken on the line 56—56 of Figure 57.

Figure 57 is a cross-sectional view of the same taken on the line 57—57 of Figure 56.

Figure 58 is a perspective view of a foot member for an intermediate post to which two unit posts are to be secured on opposite sides.

Figure 59 is a view similar to Figure 58 showing a foot member for an intermediate post wherein unit post members are secured thereto on two adjacent sides to form an L.

Figure 60 is a view similar to Figures 58 and 59 on a smaller scale showing a foot member for use in cases where three unit post members are to be secured to an intermediate post member to form a T joint.

Figure 61 is a view similar to Figure 60 showing a foot member designed for use where a unit post member is to be secured to each face of an intermediate post member to form a cross between two partitions.

Figure 62 is a cross-sectional view taken on the line 62—62 of Figure 63 showing an intermediate post with unit posts secured to opposite faces thereof.

Figure 63 is a fragmentary cross-sectional view of the same taken on the line 63—63 of Figure 62.

Figure 64 is a fragmentary cross-sectional view of the same at the bottom of the posts taken on the line 64—64 of Figure 65.

Figure 65 is a cross-sectional view of the same taken on the line 65—65 of Figure 64.

Figure 66 is a horizontal cross-sectional view through a post constituted of a pair of unit post members hooked together.

Figure 67 is a horizontal cross-sectional view showing a pair of unit posts hooked to an intermediate post to provide an L or corner arrangement.

Figure 68 is a view similar to Figures 66 and 67 showing three unit posts secured to an intermediate post to provide a T or branch arrangement.

Figure 69 is a view similar to Figures 66 to 68 inclusive showing four unit posts hooked to an intermediate post to provide a cross or X structure.

Figure 70 is a plan view with parts in section of a sleeve member for use with a post according to Figure 66.

Figure 71 is a view similar to Figure 70 showing a sleeve member for use with the structure of Figure 67.

Figure 72 is a view similar to Figure 71 showing a sleeve structure for use with the post structure of Figure 68.

Figure 73 is a view similar to Figures 70 to 72 inclusive showing a sleeve structure for use with the post arrangement of Figure 69.

Figure 74 is a perspective view of a typical arrangement of desk and table units and partition elements.

Figure 75 is a fragmentary cross-sectional view of the top of an intermediate post taken on the line 75—75 of Figure 76 showing a cap member therefor.

Figure 76 is a plan view of the same.

Figure 77 is a perspective view of the same as seen from below.

Figure 78 is a plan view of a cap member for a post structure according to Figure 65.

Figure 79 is a plan view of a cap for a post structure according to Figure 69.

Figure 80 is a plan view of a partition member showing a different panel arrangement.

Figure 81 is a view similar to Figure 80 showing still another panel arrangement.

Figure 82 is a fragmentary cross-sectional view of a shelf structure as taken on the line 82—82 of Figure 74.

Figures 24, 25:
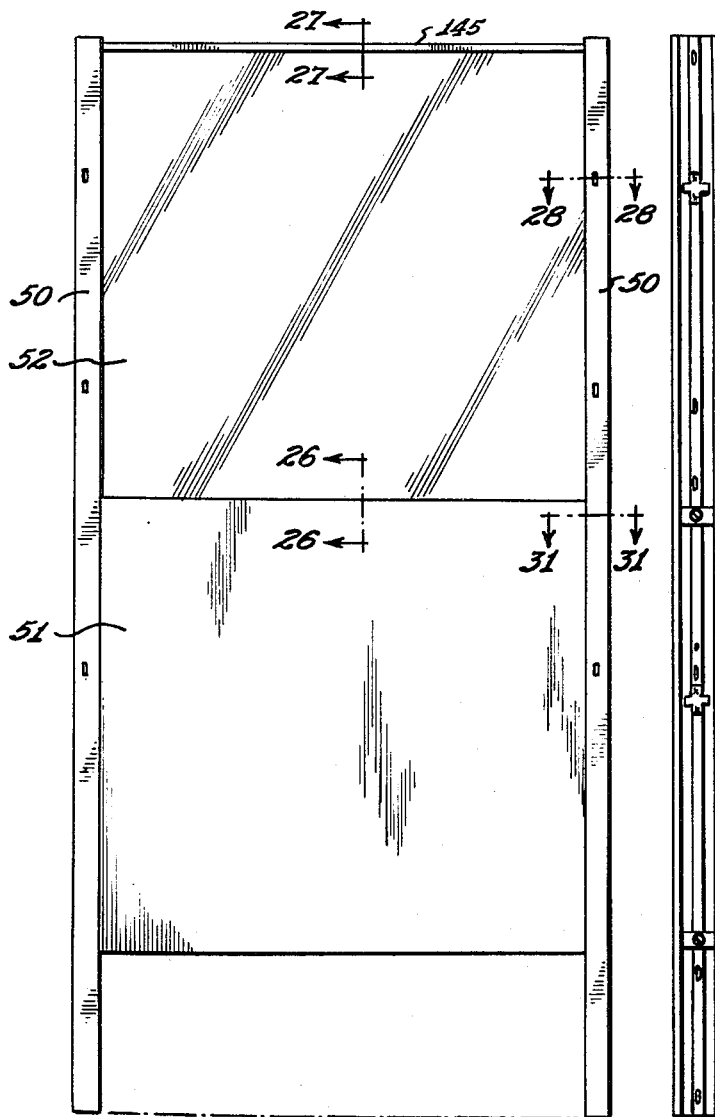
Figure 24 is a front elevational view of a partition member comprising a pair of unit posts and panel members.
Figure 25 is a side elevational view of Figure 24.
Figure 27:
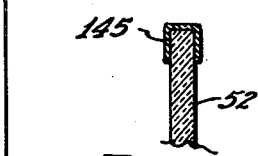
Figure 27 is a fragmentary cross-sectional view on an enlarged scale taken on the line 27—27 of Figure 24.

Briefly, in the practice of my invention I provide a plurality of desk units, a plurality of table units and various accessory units, as well as a plurality of partition units. Means are provided whereby the desk and table units may be secured together in a releasable manner and means are provided whereby the partition units may be secured to each other to provide a long straight partition, a right angled partition, a T partition or a cross partition. Means are also provided whereby the desk and table units may be removably secured to the partition unit so that a wide variety of arrangements may be set up, each of which will provide a series of L-shaped work spaces. The various units may be assembled without partitions if desired or partitions may be provided. It is possible to provide an arrangement whereby certain groups of work spaces are partitioned from other groups of work spaces without being partitioned from each other. On the other hand, the various units may be arranged so that each L-shaped work space is in effect in a cubicle by itself. The various units may be assembled and disassembled, rearranged and reassembled any desired number of times without the use of special tools or special skill so that the structure is the ultimate in flexibility.

While the embodiments herein described comprise metal desk and table units, and metallic post and partition members, it will be understood that in its broader aspects the invention is not so limited, and that the desk and table units as well as the post and partition members may be of wood, or other suitable material.

I shall describe first the desk units and the table units and proceed later with a description of how these units may be assembled and finally come to a detailed description of the partitions, including the various types of post members and the various types of panel members.

Desk and table units

A desk unit which may be used according to the present invention is indicated generally at 10 in the drawings and in actual practice I prefer to use a standard type of metal desk less one of the pedestals. Thus the desk unit 10 of Figure 1, which is seen in perspective from the rear in Figure 8, comprises a top member 11 providing a work surface, a pedestal 12 within which may be provided drawers 13 and 14. The pedestal 12 may rest upon an island 15, as is well known. Below the writing surface 11 there may be provided the usual type of center drawer 16 and the knee-hole space below the drawer 16 may be closed at the rear by a skirt member 17 if desired. The construction of the desk is of no particular consequence except as will be pointed out hereinafter, and it will be understood that the specific design or construction of the desk does not constitute a part of the present invention. While the pedestal 12 may contain drawers as shown, it can of course have a door provided with simulated drawers 13, 14 which door can be opened to reveal a typewriter supporting platform, as is well known in the art. The writing surface 11 may be covered with linoleum, as is well known.

The desk unit of Figure 9 is similar to that of Figures 1 and 8 except that the pedestal member 12a which is supported by an island 15a is narrow and is not provided with either drawers or a typewriter shelf. Also the center drawer has been eliminated so that in effect the desk unit of Figure 9 is very similar to a table unit.

A table unit is indicated in the figures at 20. As will be clear from the drawings, the table unit 20 comprises a top member which may have a linoleum or other suitable writing surface 21, and it is supported upon two end members 22. These members are of flanged channel-shaped cross section, as can be clearly seen from Figure 6, and they are suitably welded, bolted or otherwise secured to the top member 21 which is provided with downturned flanges 23. Suitable angle pieces 24 (Figure 7) are provided adjacent the bottom of the wall or end member 22 to assist in retaining the shape of these members and these members 24 are provided with threaded bosses 25 for the threaded foot members 26. The members 26 are in the nature of leveling screws to take care of unevennesses in the floor level. The open side of the members 22 is closed by panels 22a and 22b to provide a finished appearance.

In order to utilize the work space more thoroughly I prefer to provide file cabinet members 27 of a size to fit snugly under the table units 20, as clearly seen in Figure 1. The specific construction of the units 27 constitutes no part of the present invention and they need not be secured to the table units. It will suffice if they are of the correct height to fit snugly under the table units 20 as seen in Figure 1. From Figures 1 and 6 particularly it will be observed that the edges of the work surfaces of the table units 20 are provided with various slots. The longitudinal edges of the table units 20 are each provided with four sets of double slots 31. These various slots are for engagement with the hook elements of Figure 10 to secure the desk and table units to each other, as will be pointed out hereinafter.

A desk unit 10 is secured to a table unit 21 by means of the hook or clip element seen in perspective in Figure 10 and designated generally by the numeral 35. The members 35 have a pair of hook-like elements 36 and a web portion 37 extending substantially at right angles from the bottom and a lip 38 return bent for engagement with the under side of a desk top flange. The spacing between the members 36 is equal to the spacing between the double slots 31 mentioned above. In use the hook member 35 is engaged under the inwardly bent bottom flange 39 of the top 11 of a desk unit 10, as best seen in Figure 3. Two of the hook members of Figure 10 are applied to the desk unit 10 in spaced relation, and they are then engaged in a pair of adjacent double slot elements 31 of the table unit 20 to which the desk unit is to be attached. Since there are a pair of double slots 31 at each end of the table unit 20, as can be seen in Figure 6, it will be clear that a desk unit can be secured to a table unit at either end of a side thereof so as to provide a left-handed or right-handed work space as may be required.

From the foregoing description it will be seen how in Figure 1 two desk units 10 are secured to opposite ends of opposite sides of a table unit 20 so as to provide two mutually opposed work spaces of L-shaped configuration. In Figure 2 it is indicated in broken lines how the structure can be continued to provide a series of mutually opposed L-shaped work spaces. In Figure 2 chairs are indicated at 40 and the cross hatching in Figure 2 indicates the work areas for the occupants of the two chairs 40. It will be clear that each worker has an entire desk unit 10 and a substantially trapezoidal portion amounting to approximately one-half of a table unit 20 for his working area.

In Figures 1 and 2 of course no partition members have been used.

Figure 11 shows an arrangement generally similar to the arrangement of Figure 2 except that partitions are used to provide a series of partitioned cubicles for the workers. The details of the partition structure and the way in which it is secured to the desk and table units will be discussed in more detail hereinafter.

In Figure 4 there is shown an arrangement where a series of L-shaped work spaces are arranged on one side of a partition unit. Because of the structure of the partitions (which will be discussed in greater detail hereinafter) the successive table units 20 can not be butted against each other, but filler strips must be employed as indicated at 41. The nature of these filler strips is more clearly shown in Figure 5 where it will be observed that they are of generally U-shaped cross section. Straps 41a are secured to the filler strip on the inside and have bent outwardly the toe portions 42 which fit into suitable apertures 43 in the ends of the table units 20. The pedestals 22 of the table units are shown as butted together to avoid a dust-catching space therebetween. It will be understood that if in Figure 4 for example partitions are desired between the successive L-shaped work spaces, the filler strips 41 are replaced by partition units which extend the length of the desk unit 10, and the pedestals are moved apart the thickness of the partition. The filler strips 41 simply make for a better appearance between successive table units 20 where no partition units are being used in a transverse direction.

Figure 29:
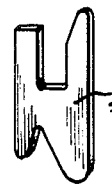
Figure 29 is a perspective view of a clip member used in securing a desk unit to a partition member.
Figure 30:
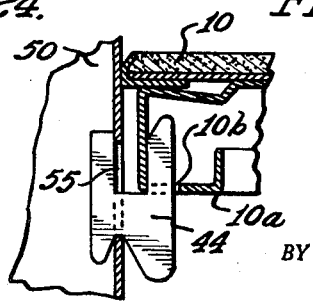
Figure 30 is a fragmentary cross-sectional view on an enlarged scale taken on the line 30—30 of Figure 11 showing the clip of Figure 29 in use.

The clip elements 44 of Figures 29 and 30 are for fastening either a desk or table unit to a partition. The clips 44 are also used for other purposes which will be described in more detail hereinafter.

The partition structure

The partition structure will now be described in detail, having reference to Figures 13 to 73 inclusive, 75 to 82 inclusive. In order to make the reading of this specification more convenient the topic of partitions will further be broken down into a discussion of the various post members and the various types of panel members. The construction of the post members, with particular reference to Figures 13 to 23 inclusive, 48 to 73 inclusive and 75 to 79 inclusive will now be discussed.

Post construction

*Unit post.*—Referring now particularly to Figures 13 to 17 inclusive, I shall describe the construction of the unit post member. Generally speaking, the partitions according to the present invention are made up of a plurality of partition members each of which comprises two unit posts indicated in the figures at 50 and a number of panel members extending between the unit posts 50 as indicated at 51 and 52. As will be pointed out hereinafter, various types of panels may be used between the unit posts 50 and these will be discussed in greater detail hereinafter. The present description will have to do with the construction of the unit posts 50 themselves.

The unit posts are all of a cross section best seen in Figure 16. They are generally of rectangularly cross-sectional shape having a flanged open face. The open face is provided with the inturned flanges 53; the end wall members 54 are provided with slots 55 at intervals; and the face 56 opposite the open face is provided with a longitudinal inwardly directed channel 57. Within the box-like structure of the unit posts there are provided at spaced points the hook engaging elements 58, best seen in Figures 16 and 17. These members are made of flat pieces of sheet metal having downturned lips 58a to engage over the channel members 57 and substantially centrally thereof they are provided with the laterally extending wing members 58b. The members 58 are suitably secured as by spot welding to the channel members 57 and the wings 58b thereof provide elements for engagement by hook elements to be described in more detail hereinafter. A series of holes and elongated holes are provided in the channel 57 for the purpose of securing to the unit post members the panel members which are used therewith. Thus in each unit post member there is a hole at 59 and a hole at 60. In addition there are slots or elongated holes at 61. In use with panels, the panels engage within the channels 57 so that the open faces thereof having the marginal flanges 53 face outwardly. The unit post members which are thus an essential part of each partition element serve for the attachment of one partition element to an adjacent partition element, for the attachment of a partition element to an end post member or for the attachment of a partition element to an intermediate post member.

*Intermediate post members.*—The intermediate posts are indicated generally by the numeral 70 and are shown in detail in Figures 18 to 21 inclusive and 48 to 53 inclusive. A complete end post is constituted of two like members, each of which is channel-shaped in cross section with inwardly turned flanges at the ends of the leg portions. Thus, as best seen in Figure 21, the intermediate post elements have a web portion 71, leg portions 72, the flanged portions 73, and they are provided with the double slots 74 in the web portion 71 and the single slots 75 in the leg portions 72. The web portion 71 adjacent the lower end thereof is cut out slightly as indicated at 76 for a purpose which will appear more clearly hereinafter and a lip 77 is struck out also for a purpose which will be pointed out in more detail hereinafter. As best seen in Figures 48 and 49, two like members are butted together with the flanges 73 in abutting relation and welded together as indicated at 78. There is thus formed an elongated post member of substantially square cross section having double slots on all four sides, since it will be clear that a pair of the slots 75 will have the same spacing as the double slots 74 mentioned above. An intermediate post is completed by means of a bottom closure member 79 seen in detail in perspective in Figure 52. The member 79 has the upturned flanges 80 which extend upwardly within the box-like structure 70, the V-shaped notches 81 giving clearance for the juxtaposed flanges 73 and assuring proper alignment. The bottom portion of the members 79 abuts against the inwardly struck out lip 77 mentioned heretofore, as best seen in Figures 50 and 51. Centrally thereof a boss 82 is provided and is internally threaded to accept a foot screw 83. By means of adjustment of the screw 83 the height of the intermediate post may be adjusted to suit unevenness of the floor surface.

*End post members.*—End post members, as best seen in Figures 22 and 23 and indicated by the numeral 90, are very similar to one of the half portions of an intermediate post and also to a unit post. They differ from the unit posts in not being provided with the channel 57. They have the web portion 91, leg portions 92 and the inwardly turned flange portions 93. In order to secure the end post members to the unit post members they must be provided with complementary hook engaging elements similar to the members 58 discussed above in connection with the unit posts. Since the end post members do not have the channel 57 the attaching elements differ from the members 58. Thus they comprise a member 94 of bridge-like configuration suitably welded or otherwise secured to the web 91 and centrally thereof provided with the laterally extending wing members 95. The wing members 95 correspond to the wing members 58b and are of the same dimensions and equally spaced from the web 91. These members 94 are provided in connection with the end posts at the same spacing as they are on the unit posts.

*Post combinations.*—In order to secure the various post elements together I make use of a hook-like member best seen in perspective in Figure 53 and indicated generally at 100. The member 100 has a pair of upwardly directed hook elements 101 at one end and a pair of downwardly directed hook elements 102 at the opposite end. The spacing between the members 101 and the members 102 is equal to the spacing between the pairs of slots 74 which again is equal to the spacing between adjacent slots 75 in an assembled intermediate post and which is also slightly greater than the width of the channels 57 discussed above. Thus by means of a number of hook members 100 as described immediately above an end post according to Figures 22 and 23 can be secured to a unit post according to Figures 13 to 17 inclusive, as best seen in cross section in Figures 54, 55 and 56. The same reference numerals apply in these figures as have been used above so that the unit posts are indicated generally at 50 and the end posts are indicated generally at 90. Such a combination is used at a free end of a partition as, for example, the point A in Figures 4, 11, 12 and 74. The end post members 90 are free of slots and thus present a finished appearance at the end of a partition run. Similarly of course a pair of unit posts 50 may be assembled together as best seen in cross section in Figure 66, the same hook members 100 being used and engaging the wings 58b of the unit post and the wings 95 of the end post respectively. Such a construction is used where it is desired to join two partition elements to each other without an intermediate post as indicated, for example, at B in Figures 4, 11, 12 and 74.

Similarly one or more unit posts may be joined to an intermediate post by means of the hook members 100. Actually the hook members used for joining unit posts to intermediate posts differ slightly in that they are slightly narrower and in order to avoid confusion they will be designated by the numeral 110. Thus in Figures 62, 63 and 64 I have shown two unit post members 50 joined to opposite faces of an intermediate post member 70. Such a construction is used where it is desired to run a lateral partition or to make a corner, and examples of this use are shown in Figures 4, 11, 12 and 74 at C. It will be clear that the combination of two or more unit posts with an intermediate post may take the form of Figures 62 to 65 inclusive where a straight continuing partition is desired or the form of Figure 67 where a right angle connection is desired, the form of Figure 68 where a T joint is desired or the form of Figure 69 where a cross connection is desired.

In addition to the hook members 110 which are used to hook the unit post members to the intermediate posts I provide the foot members shown in Figures 58, 59, 60 and 61. It will be understood that the foot member of Figure 58 is for the arrangement of Figures 62 to 65 inclusive, that of Figure 59 corresponds to Figure 67, that of Figure 60 to Figure 68 and that of Figure 61 to Figure 69. For simplicity's sake these foot members will be designated by the single reference numeral 105 and will be said to have two or more upstanding curved flanges 106. Centrally of the portion 105 they are provided with the aperture 107 to clear the adjusting screw 83. As will be clear from Figure 64, a member 105 is welded to the bottom member 79 of an intermediate post and then provides the spaced flanges 106 spaced outwardly beyond the intermediate post to receive the inturned flanges of the respective unit posts. The structure will be the same regardless of whether two, three or four unit posts are secured to two, three or four faces of an intermediate post except that the appropriate one of the members 105 will be employed, as shown in Figures 58 to 61 inclusive. The appearance in cross section of such combinations is shown in Figures 62, 67, 68 and 69 respectively.

In order to avoid the unsightly appearance of the supporting screws 83 which may be at different levels particularly if the floor is uneven, I provide the sliding cover sleeve member of Figures 70, 71, 72 and 73 respectively. These are made of sheet metal to correspond to the structures of Figures 66, 62, 67, 68 and 69 respectively. Thus in Figure 70 I have shown a sleeve member comprising two U-shaped pieces 115 which are like in configuration and which are nested with respect to each other as shown. Each of the members 115 has in one arm a notch or aperture 116 and in the opposite arm a struck out tongue 117. The tongues 117 engage in the apertures 116 as shown to hold a sleeve in assembly. The sleeve of Figure 70 is used in connection with a structure like that of Figure 66 or that of Figure 56. The device indicated at 120 in Figure 64 is similar except that the two members constituting the sleeve 120 are elongated so as to make a rectangularly cross-section sleeve. The structure of Figure 71 consists of two pieces 121 and 122 having the same notch and aperture construction described above at 116, 117. The pieces 121 and 122 are assembled to produce an L-shaped structure suitable for use with the post combination of Figure 67.

The structure of Figure 72 comprises two pieces 123 and 124 which are again assembled by the same notch and aperture arrangement. The piece 123 is the same piece as is used to make the sleeve 120 or in connection with the piece 124 to make the sleeve arrangement of Figure 72.

The piece 124 used with a like piece 124 will make the structure of Figure 73 used with the post combination of Figure 69. The sleeves are freely slidable on the post combination so that regardless of the height of the bottom of the post above the floor the sleeve will rest upon the floor and conceal the adjusting screw, as clearly seen in Figure 64.

In order to provide for a finished appearance at the top of the various post members I provide cap pieces such as shown in detail in Figures 75 to 79 inclusive. Fundamentally these pieces comprise a closure member similar to that of Figure 52 and indicated at 130 having the flanges 131 which fit down inside the posts and to which are secured by welding or in any suitable way the cap pieces 132 for the combination of Figures 54 or 66, a rectangular piece 133 for the structure of Figure 62, a cross shaped piece 134 for the structure of Figure 69 and a T- or L-shaped piece for the structure of Figures 68 or 67. The cap pieces 132 are provided with the flanges 132a to provide a finished appearance.

*Panel construction*

The panel construction will now be discussed with particular reference to Figures 24 to 27 inclusive and 80 and 81.

In Figure 24 I have indicated a partition element provided with the two panels 51 and 52. In the embodiment of Figure 24 the panel 51 is what will be referred to hereinafter as a sheet metal panel and the panel 52 is a glass panel. Hereinafter I shall discuss additionally sound-proof panels of perforated sheet metal construction, sound-proof panels of perforated Masonite construction; and it will be understood that in any partition element the two panels may be the same, they may both be of any one of the four types to be discussed hereinafter or any two of the four may be used as circumstances may require.

Taking up first in detail the construction of the sheet metal panels such as is illustrated at 51, and with particular reference to Figures 32 to 40 inclusive, each panel comprises the outer sheet metal members 130. The panels 130 are generally of rectangular form and are provided with the side flanges 131 and the top and bottom flanges which differ very slightly from each other. Thus one of the sheet metal panels 130 has the top and bottom channels 132 with the outwardly extending flanges 133. The other panel 130 has the same upper and lower flanges 132, but the outwardly extending flanges 133a are of greater extent. The lateral flanges 131 are provided with the outwardly extending flanges 134 extending laterally in a plane parallel to the plane of the panel 130. The major internal surface of each of the panels 130 has adhesively secured thereto a piece of corrugated paperboard or the like as indicated at 135 in order to dampen vibration and reduce the noise transmission qualities of the sheet metal. In order to provide for securing the panel members to unit post members pieces of plate which may be in the form of a channel section as indicated at 136 are suitably fastened as by spot welding to one of the panel members 131, as best seen in Figures 35 and 36. Each of the members 136 is provided with a threaded hole 137 for the passage of a fastening screw, as will be described hereinafter. The flanges 133 and 133a are drilled for the passage of sheet metal screws indicated at 138. The two panel members 131 shown in exploded view in Figures 35 and 36 are assembled together by means of the sheet metal screws 138 and the lateral flanges 134 are then engaged in the channels 57 of the respective unit post members 50 described heretofore. In securing the unit posts 50 to the completed panels use is made of the arch-like clamping members 140 shown in detail in Figure 40. These are provided with the hole 141 for the passage of the fastening screws 142. The members 140 are placed within the unit posts 50 as best seen in Figure 31 arching over the channel member 57 and engaging with the face 56 of the unit posts and the screws 142 are then inserted through the hole 141 in the members 140 and through appropriate holes in the channels members 57, finally engaging with the threaded holes 137 in the plates 136. When completely assembled there will be at the top and bottom of each panel a channel as best seen in the elevational view of Figure 34.

In the event that two panels as described above are to be used in a partition element there will of course be two mutually opposed channels as illustrated for example in Figure 39. In such case in order to avoid transmission of light between the two panel members the mutually opposed channels may be filled with a strip of felt or the like as indicated at 143. This is simply to prevent passage of light through the crack between the upper and lower panel members of a partition element.

Figure 28:
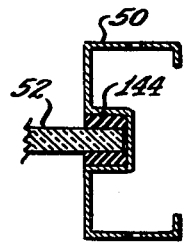
Figure 28 is a fragmentary cross-sectional view on an enlarged scale taken on the line 28—28 of Figure 24.
Figure 26:
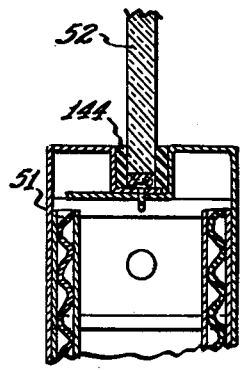
Figure 26 is a fragmentary cross-sectional view on an enlarged scale taken on the line 26—26 of Figure 24.

Returning now to Figures 24 and 26, if the upper panel 52 is of glass, some suitable substance like a cork compound, felt, rubber or the like, is adhesively secured to the edges of the pane of glass 52 as indicated at 144 and the pane is seated in the channel. The same construction is used where the glass panel 52 joins the unit post 50 as seen in Figure 28. The top of a glass panel may be finished by a suitable chrome cap or the like as indicated at 145.

Figure 41:
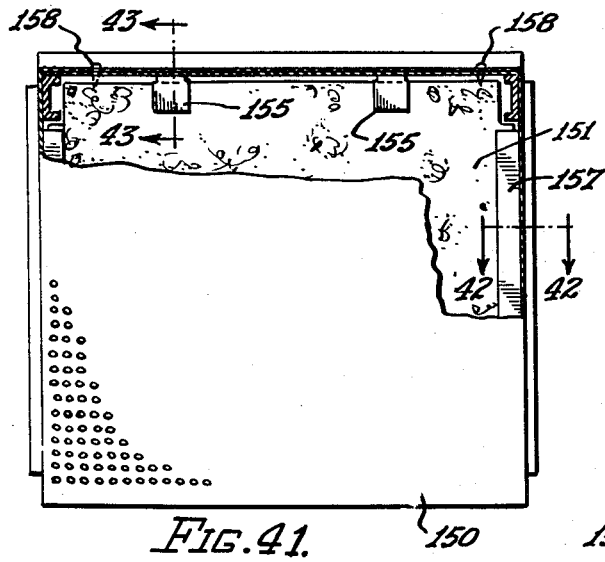
Figure 41 is a front elevational view with parts broken away to show the construction of a different type of panel member made of perforated sheet metal with insulation inside.
Figure 43:
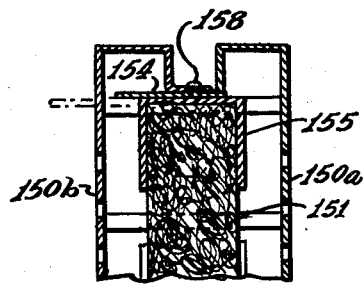
Figure 43 is an enlarged fragmentary cross-sectional view taken on the line 43—43 of Figure 41.
Figure 42:
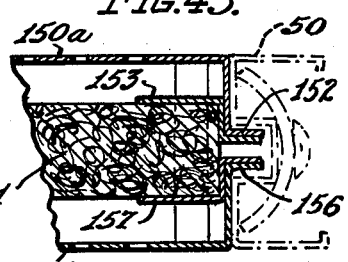
Figure 42 is a fragmentary enlarged cross-sectional view taken on the line 42—42 of Figure 41.

The perforated metal panel construction is illustrated in detail in Figures 41 to 43 inclusive. The outer panel members 150 are very similar to the panels 130 described above except that they are of perforated sheet metal. Their edge configuration is similar to that described in connection with Figures 32 to 36 inclusive, however, instead of the panels 150 being adhesively lined with corrugated paperboard there is provided a central panel of fibrous insulating material 151. In order to facilitate an understanding of the assembly of this panel one of the members 150 will be designated specifically as 150a and the other as 150b. Secured to the lateral flanges 152 of the panel 150a are the Z-shaped strips 153. These may be spot welded in position. Secured as by spot welding to the top flange 154 of the panel 150a is an L-shaped piece 155. The original position of the L-shaped piece is indicated in broken lines in Figure 43. Thus when the panel 150a is used as in Figure 41, where it is broken away in the upper portion, there are on the two sides, shelves constituted by the pieces 153 and at the top and bottom, ledges constituted by the pieces 155. The panel of insulating board 151 is laid on the members 153 and 155 and the ends of the members 155 are bent down to hold the panel 151 in position, as indicated by the broken line arrow in Figure 43. The final configuration of the member 155 is shown in solid lines.

The panel 150b has secured by spot welding or the like to its lateral flanges 156 the Z-shaped pieces 157. In the final assembly the panels 150a and 150b are pressed together and secured together by means of sheet metal screws as at 158 in Figures 43 and 41. The panels of Figures 41 to 43 inclusive are secured to unit posts 50 in the same manner as described above for the panels of Figures 32 to 36 inclusive. The fastenings are shown in broken lines in Figure 42.

In Figures 44 to 47 inclusive I have illustrated yet another type of panel construction wherein the outer panels are of perforated sheets of Masonite indicated at 160. The top and bottom frame members are constituted of the channel elements 161 having the inturned edges 162 and the inner fish hook channel members 163 having the fish hook elements 164. The channels 161 and 163 are secured together as by spot welding.

Figures 46, 47:
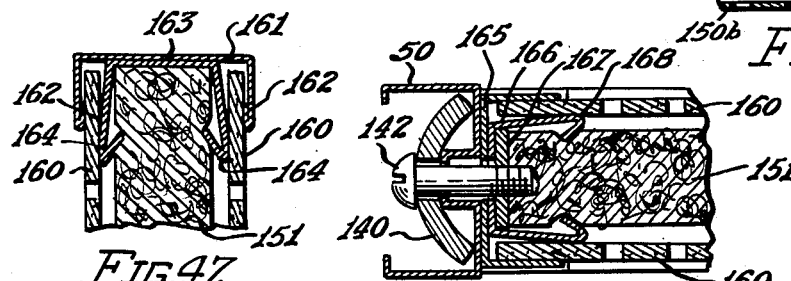
Figure 46 is a fragmentary cross-sectional view of the same taken on the line 46—46 of Figure 44.
Figure 47 is a fragmentary cross sectional view taken on the line 47—47 of Figure 44.
Figure 45:
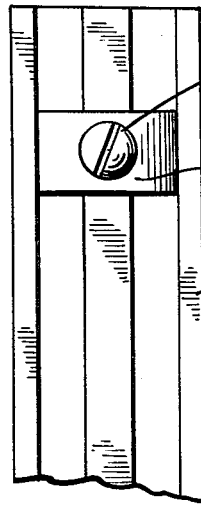
Figure 45 is a side elevational view of the same as seen from the left of Figure 44.
Figure 44:
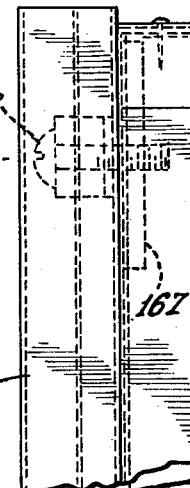
Figure 44 is a fragmentary front elevational view of a panel of a different construction involving perforated Masonite.

A similar construction is employed along the side edges where the channel members 165 and 166 are suitably spot welded together. Within the channel 166 are provided the plate members 167 which are drilled and threaded for the screws 142. In assembling the structure, two side channels 165 are attached to a channel member 161. The piece of insulating material 151 is then simply pushed into the channels 163 and 163 so that it is engaged by the fish hook portions 164 and 168 respectively. The Masonite panels 160 are then slipped into the spaces between the channels 163 and 161 and 166 and 165 as best seen in Figures 46 and 47, after which the other channel member 161 is pushed over the insulating material and Masonite panels and fastened in place with screws. The panels are secured to unit posts 50 as shown in Figure 46 in the same way as described above in connection with the various other panels.

From the foregoing description it will be seen that I have disclosed panels of steel, insulating panels of perforated sheet metal and insulating panels of perforated Masonite and glass panels. In Figure 12 for example the left-most partition element is constituted of two steel panels. The second partition element is also constituted of two steel panels. The central element is constituted of a lower steel panel with an upper perforated metal panel. The fourth element from the left has a lower steel panel and an upper perforated Masonite panel and the fifth partition element has a lower steel panel and an upper glass panel. It will be understood that in all cases all the lower panels could be steel and all the upper panels glass. All the lower panels could be either the perforated metal or perforated Masonite and the upper panels of glass. Any other combination suitable to prevalent conditions may of course be used. Since the panels, no matter what their construction, are secured to unit posts and since the unit posts may be secured to each other and to end posts and intermediate posts as described above, the possible number of variations is endless.

In the preferred embodiment two panels are used in each partition element, the panels being in practice twenty-eight inches high. There is thus left a ten inch space at the bottom for air circulation. It will be understood that a ten inch panel may be provided according to any of the constructions described above and that arrangements such as in Figures 80 and 81 may be employed. In these figures the twenty-eight inch panels are indicated at 170, and it will be understood that these may be of any of the heretofore described constructions and the narrow panels are indicated at 171 and these likewise may be of any of the desired constructions. In Figure 80 the narrow panel is shown in use at the bottom and in Figure 81 it is shown in use in the middle.

I have heretofore described how the various post units are connected together so as to connect together various partition elements. I have also described how the desk and table units are connected to each other. I shall now briefly describe how the partition units are connected to the desk and table units. For this purpose I use the clips 44 shown in detail in Figure 29. As seen in Figure 30 for example, where a post unit may be indicated at 50 for example, the member 44 may be canted and inserted into one of the slots 55. A desk or table unit may then be hooked onto the member 44 as shown in Figure 30. For this purpose the flange 10a is provided with suitable apertures 10b.

The desk and table units are secured to each other by means of the members of Figure 10, with the hook elements 36 engaging in the double slots 31 of the table unit, and the elements 37, 38 engaging under the flange of the desk unit as seen in Figure 3. Thus any desired arrangement can be readily accomplished without the use of special tools or special skill. The arrangement once set up can be disassembled, rearranged and reassembled any number of times.

In Figure 74 I have shown another typical arrangement of an L-shaped cubicle showing how, for example, a shelf element may be provided as at 180. The shelf structure may for example comprise a piece of metal bent to a right angle as seen in Figure 82 and having a strengthening flange 181 at the forward lower edge and a rolled edge at 182 to which are secured side panels 183 having inwardly bent rear flanges 184 provided with slots 185. By means of the hook members 44 such a shelf structure may be hooked to the unit posts 50 in the same manner as described above in connection with other uses of the hook members 44. In order to provide for a snug fit, plates 180a may be spot welded to the flanges 184, so that the combined thicknesses of the plates 180a, flanges 184 and the post wall fill the slot in the members 44.

In Figure 74 I have also illustrated how the cubicles may be conveniently wired for electrical outlet. Thus an electrical conduit is indicated at 190 entering a channel member 200, attached by sheet metal screws or the like to a combination unit and end post, and running along the top of the partition. An electrical outlet is indicated at 191 mounted on a partition panel at the end of a branch channel 201. Where there is a low transverse partition, as shown in Figure 74, a branch channel 202 may run down the post and across the top of the low partition as indicated at 203. Outlets may then be provided as at 204. The channel members 200 may comprise outwardly facing open channels and cover strips fitting over the open channels.

It will be understood of course that various refinements and modifications will suggest themselves to those skilled in the art. It will be clear from what I have said before that the specific details of construction of the desk units and table units do not constitute a part of the present invention except insofar as has to do with the way in which the partition elements are secured thereto.

It will be seen that I have disclosed a construction which represents the ultimate in flexibility since any desired number of desk and table units may be assembled in the form of L-shaped work areas with or without partitions and if partitions are chosen they may be of any one of four different types.

With the foregoing considerations in mind it will be clear that I do not intend to limit myself to any detail except as set forth in the claims which follow and that in general the showing in the drawings is by way of example.

Having now fully described my invention, what I claim as new and desire to secure by Letters Patent is:

1. In combination, a desk unit having a rectangular work surface having a bottom flange and a pedestal, and a table unit having a rectangular work surface and two pedestals, the work surface of said desk unit and table unit being disposed at equal height, said table unit having on one side edge, adjacent one end at least, pairs of parallel vertical slots, and a plurality of fastening elements each having an element releasably engaged under the bottom flange of said desk unit and having a pair of vertical hook elements releasably engaged in said parallel vertical slots of said table unit, to provide an L-shaped work area.

2. In combination, a table unit having a rectangular work surface having a bottom flange and two pedestals, and two desk units having rectangular work surfaces and single pedestals, the work surfaces of said desk units and table unit being disposed at equal height, said table unit having on opposite side edges, adjacent opposite ends at least, pairs of parallel vertical slots, and a plurality of fastening elements each having an element releasably engaged under said bottom flange at the end of said desk unit and having a pair of hook elements releasably engaged in the parallel vertical slots of the respective table units, to provide on opposite sides of said table unit oppositely arranged L-shaped work areas.

3. In combination, a plurality of table units having rectangular flanged work surfaces and two pedestals, said table units being disposed substantially end to end, filler strips disposed between the ends of adjacent table units and having flange portions engaging behind the flanges of said table units, and a like number of desk units having rectangular work surfaces having flanges and single pedestals, the work surfaces of said desk units and table units being disposed at equal height, said table units having on one side, adjacent one end at least, pairs of parallel vertical slots, and a plurality of fastening elements each having an element releasably engaged under a respective bottom flange at the end of a desk unit and having a pair of vertically disposed hook elements releasably engaged in the parallel vertical slots of said table units to provide a series of L-shaped work areas.

4. In combination, a plurality of table units having rectangular flanged work surfaces and two pedestals, said table units being disposed substantially end to end, filler strips disposed between the ends of adjacent table units and having flanges engaging behind the flanges of said table units, and a like number of desk units having rectangular flanged work surfaces and single pedestals, the work surface of said desk units and table units being disposed at equal height, said table units having on each side, at opposite ends of said table units at least, pairs of parallel vertical slots, and a plurality of fastening elements each having an element releasably engaged under said flange at the end of the respective desk units and having a pair of vertical hook elements releasably engaged in the parallel vertical slots of the respective table units, to provide on opposite sides of said table units a series of oppositely arranged L-shaped work areas.

5. The structure of claim 4 in combination with a partition, said partition having a series of vertical slots and H-shaped fastening elements engaged in the vertical slots in said partition and engaging under the flanges of one of said units.

6. The structure of claim 5, wherein said partition is secured to the opposite side edge of the work surface of said table unit from said desk unit.

7. A structure according to claim 5, wherein said partition is secured to a side edge of said desk unit.

8. The structure of claim 4, in combination with two partition units, said partition units having vertical slots and a plurality of H-shaped fastening members engaged in the vertical slots of said partition units, the H-shaped fastening elements of one partition being engaged under the flange on the opposite side of the work surface of said table unit and the H-shaped fastening elements of said other partition unit being engaged under the flange of the adjacent side edge of the work surface of said desk unit.

References Cited in the file of this patent

UNITED STATES PATENTS

| | | |
|---|---|---|
| 1,110,948 | Langdon | Sept. 15, 1914 |
| 1,582,573 | Caldwell | Apr. 27, 1926 |
| 1,585,102 | Langdon | May 18, 1926 |
| 1,892,415 | Ulrich | Dec. 27, 1932 |
| 1,998,138 | Kiesecker | Apr. 16, 1935 |
| 2,260,657 | Bohnsack | Oct. 28, 1941 |
| 2,352,702 | Fowles | July 4, 1944 |
| 2,489,493 | Kuenzie | Nov. 29, 1949 |
| 2,489,933 | Schwarz | Nov. 29, 1949 |
| 2,596,663 | Duffy | May 13, 1952 |
| 2,636,224 | Murdock | Apr. 28, 1953 |
| 2,658,810 | Ellis | Nov. 10, 1953 |
| 2,694,614 | Dent | Nov. 16, 1954 |

UNITED STATES PATENT OFFICE
CERTIFICATE OF CORRECTION

Patent No. 2,930,665                          March 29, 1960

Steve G. Budai

It is hereby certified that error appears in the printed specification of the above numbered patent requiring correction and that the said Letters Patent should read as corrected below.

Column 13, line 27, after "surfaces" insert -- having a bottom flange --.

Signed and sealed this 11th day of April 1961.

(SEAL)
Attest:

ERNEST W. SWIDER
Attesting Officer

ARTHUR W. CROCKER
Acting Commissioner of Patents